(12) United States Patent
Chen

(10) Patent No.: US 6,373,691 B1
(45) Date of Patent: Apr. 16, 2002

(54) INTERFACE CARD MOUNTING STRUCTURE FOR A COMPUTER MAINFRAME

(75) Inventor: Chih-Sheng Chen, Taoyuan (TW)

(73) Assignee: Mace Tech Corp., Taoyuan (TW)

( * ) Notice: Subject to any disclaimer, the term of this patent is extended or adjusted under 35 U.S.C. 154(b) by 26 days.

(21) Appl. No.: 09/667,789

(22) Filed: Sep. 22, 2000

(51) Int. Cl.$^7$ ................................................ H05K 7/14

(52) U.S. Cl. ...................... 361/683; 361/684; 361/686; 361/756; 361/759; 312/223.2; 174/138 G

(58) Field of Search ................................ 361/683–686, 361/732, 740, 756, 759, 741, 747, 801–802, 816, 807, 825, 798, 730, 752; 312/223.2, 765.6; 24/563; 174/138 G; 360/137; 364/708.1; 439/160, 345, 346, 157, 61, 928, 928.1

(56) References Cited

U.S. PATENT DOCUMENTS

| 5,544,006 A | * 8/1996 | Radloff et al. ............... 361/683 |
| 5,715,146 A | * 2/1998 | Hoppal ........................ 361/796 |
| 5,831,821 A | * 11/1998 | Scholder et al. ............ 361/686 |

* cited by examiner

Primary Examiner—Leo P. Picard
Assistant Examiner—Michael Datskovsky
(74) Attorney, Agent, or Firm—Troxell Law Office PLLC

(57) ABSTRACT

An interface card mounting structure includes a computer mainframe, the computer mainframe having plug holes and a horizontal positioning flange disposed at top and bottom side of a rear opening thereof, a support frame mounted in the computer mainframe at a front side, and a rack fastened to the support frame to hold an interface card holder frame in the rear opening of the computer mainframe for receiving interface cards in vertical, the interface card holder frame having plug portions and a coupling flange respectively coupled to the plug holes and horizontal positioning flange of the computer mainframe.

2 Claims, 4 Drawing Sheets

INTERFACE CARD MOUNTING STRUCTURE FOR A COMPUTER MAINFRAME

BACKGROUND OF THE INVENTION

The present invention relates to an interface card mounting structure for a computer mainframe, and more particularly to such an interface card mounting structure, which is detachably fastened to a computer mainframe, and adapted to hold individual interface cards in vertical.

Different interface cards may be installed in a computer mainframe to enhance the functions. Regular horizontal type computer mainframes are commonly equipped with multiple interface card holders adapted to hold individual interface cards in vertical. However, the vertical interface card positioning design greatly increases the height of the computer mainframe.

SUMMARY OF THE INVENTION

The present invention has been accomplished under the circumstances in view. According to one aspect of the present invention, the interface card mounting structure comprises a computer mainframe, the computer mainframe having plug holes and a horizontal positioning flange disposed at top and bottom side of a rear opening thereof, a support frame mounted in the computer mainframe at a front side, and a rack fastened to the support frame to hold an interface card holder frame in the rear opening of the computer mainframe for receiving interface cards in vertical. According to another aspect of the present invention, the interface card holder frame having plug portions and a coupling flange respectively coupled to the plug holes and horizontal positioning flange of the computer mainframe. According to still another aspect of the present invention, the interface card holder frame can be removed with the rack from the computer mainframe, so that individual interface card holders can be respectively installed in the vertical rear side wall of the computer mainframe to hold interface cards in the computer mainframe in vertical.

DETAILED DESCRIPTION OF THE PREFERRED EMBODIMENT

Figure 1:
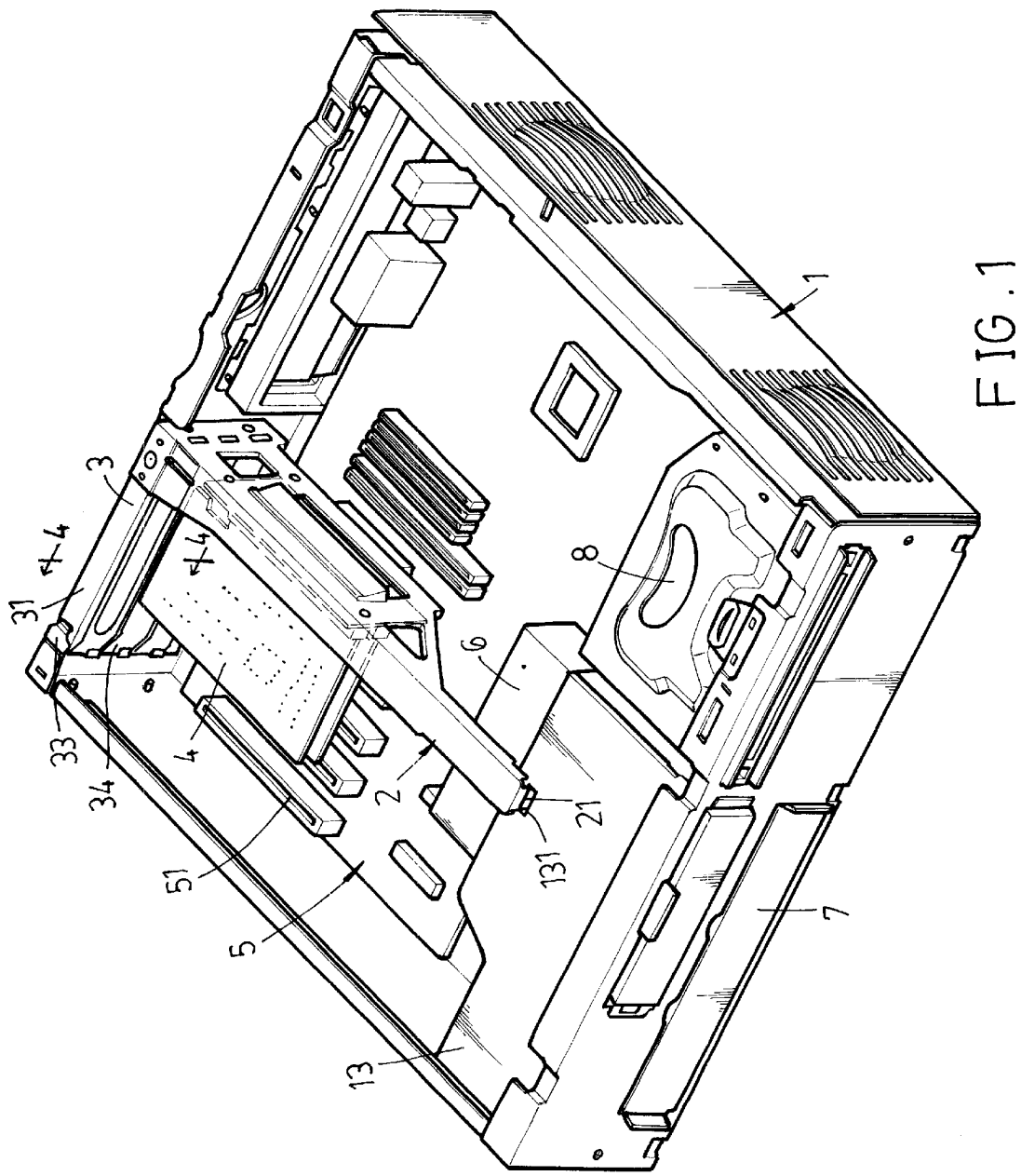
FIG. 1 is a perspective view showing the internal structure of a computer mainframe constructed according to the present invention.
Figure 2:
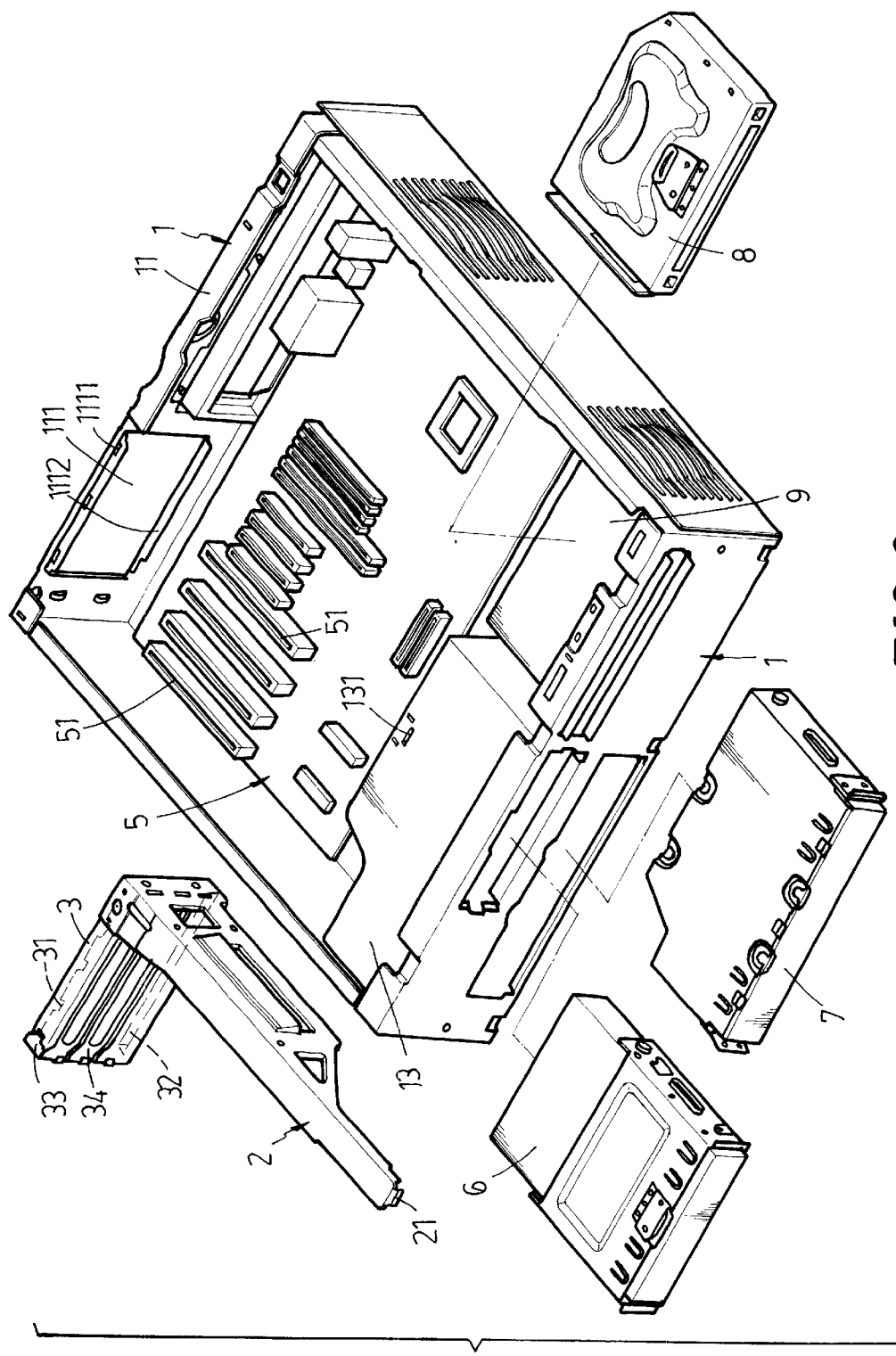
FIG. 2 is an exploded view of FIG. 1.
Figure 4:
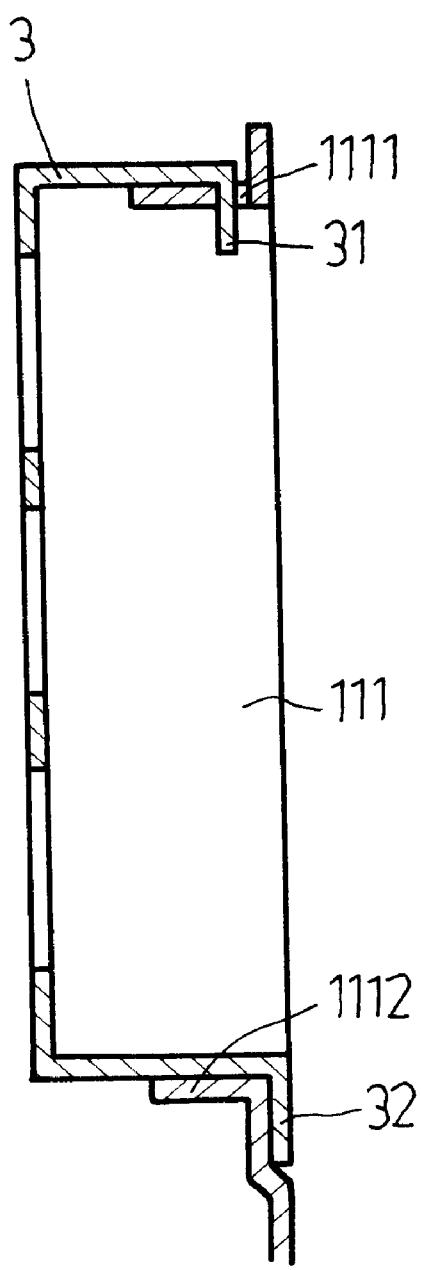
FIG. 4 is a sectional view in an enlarged scale taken along line 4—4 of FIG. 1.

Referring to FIGS. 1, 2 and 4, a floppy diskdrive 6 and a CD-ROM player 8 are installed in the front side of a computer mainframe 1 at the top and horizontally arranged in parallel. A hard diskdrive 7 and an AC adapter 9 are installed in the front side of the computer mainframe 1 at the bottom below the floppy diskdrive 6 and the CD-ROM player 8. The rest holding space of the computer mainframe 1 is adapted to hold a main board 5, interface cards 4, and other component parts including a CPU. The computer mainframe 1 shown in the drawings is a horizontal type having a thickness about 8.5~9 cm.

The computer mainframe 1 comprises an opening 111 on the vertical rear side wall 11 thereof. A support frame 13 is fastened to the vertical front side wall of the computer mainframe 1 on the inside above the floppy diskdrive 6 and aimed at the opening 111. A rack 2 is coupled between the vertical rear side wall 11 of the computer mainframe 1 and the support frame 13 to hold an interface card holder frame 3 in the opening 1111. The interface card holder frame 3 comprises a plurality of plug portions 31 disposed at the top side thereof and respectively engaged into respective plug holes 1111 on the vertical rear side wall 11 of the computer mainframe 1 at the top side of the opening 111, a coupling flange 32 horizontally disposed at the bottom side thereof and coupled to a horizontal positioning flange 1112, which is formed integral with the vertical rear side wall 11 at the bottom side of the opening 1111, a plurality of horizontal interface card receiving units 34 disposed at different elevations between the plug portions 31 and the coupling flange 32 and adapted to receive interface cards 4 individually, and a plurality of fastening devices 33 respectively provided at one side of the horizontal interface card receiving units 34 and adapted to lock interface cards 4 in the horizontal interface card receiving units 34. The rack 2 has a hooked portion 21 disposed at the front side thereof remote from the interface card holder frame 3 and hooked in a hook hole 131 on the support frame 13.

Figure 3:
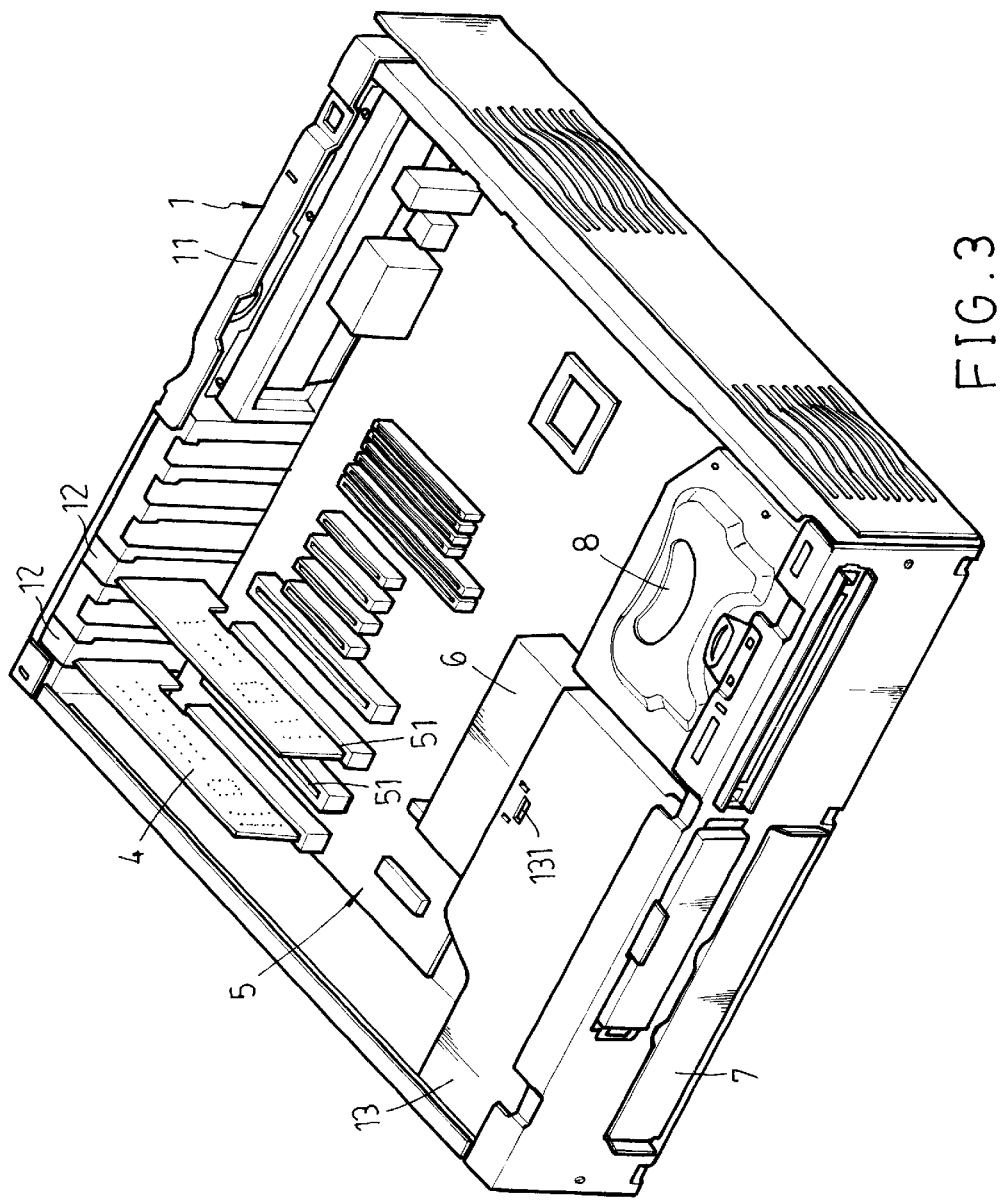
FIG. 3 illustrates interface card holders fastened to the vertical rear side wall of the computer mainframe, and individual interface cards installed in the interface card holders in vertical after removal of the rack according to the present invention.

Referring to FIG. 3, after removal of the aforesaid rack 2 from the computer mainframe 1, individual interface card holders 12 are respectively installed in the vertical rear side wall 11 of the computer mainframe 1 to hold interface cards 4 in the computer mainframe 1 in vertical.

What the invention claimed is:

1. An interface card mounting structure comprising:

a computer mainframe, said computer mainframe comprising a vertical front side wall, a vertical rear side wall, an opening in said vertical rear side wall, a plurality of plug holes horizontally arranged on said vertical rear side wall at a top side of said opening, and a horizontal positioning flange formed integral with said vertical rear side wall and disposed at a bottom side of said opening;

a support frame fixedly fastened to said vertical front side wall of said computer mainframe and aimed at the opening in said vertical rear side wall of said computer mainframe; and a rack coupled between said vertical rear side wall of said computer mainframe and said support frame, said rack comprising an interface card holder frame disposed at a rear side thereof and mounted in said opening of said computer mainframe and adapted to hold a plurality of interface cards in horizontal at different elevations, and a front side coupled to said support frame, said interface card holder frame comprising a plurality of plug portions disposed at a top side thereof and respectively engaged into the plug holes on said vertical rear side wall of said computer mainframe, and a coupling flange horizontally disposed at a bottom side thereof and coupled to the horizontal positioning flange of said computer mainframe.

2. The interface card mounting structure of claim 1 wherein said support frame comprises a hook hole, said rack comprises a hooked portion extended from the front side thereof and hooked in the hook hole of said support frame.

* * * * *